Nov. 19, 1935.  C. E. HATHORN  2,021,306
TAIL WHEEL
Filed March 20, 1933  2 Sheets-Sheet 1
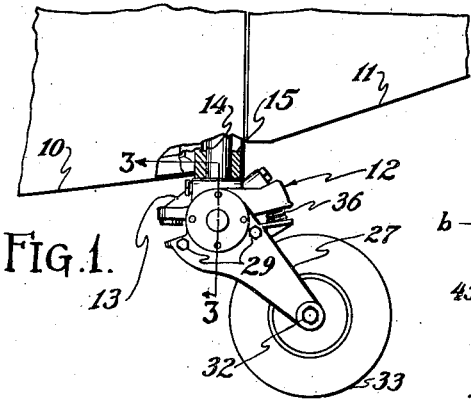
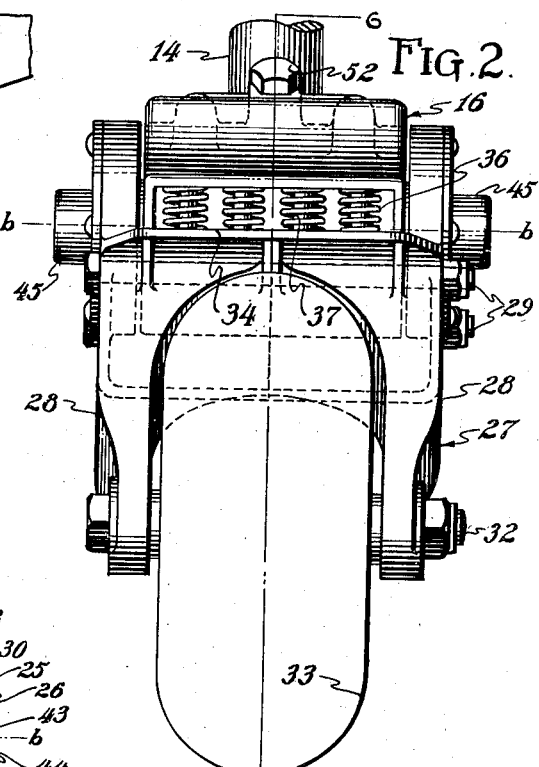
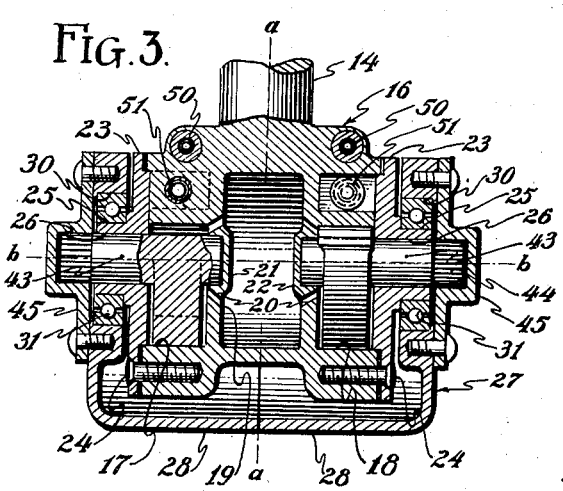
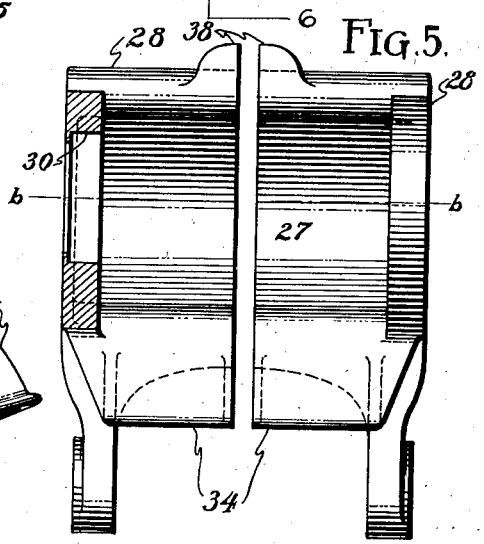
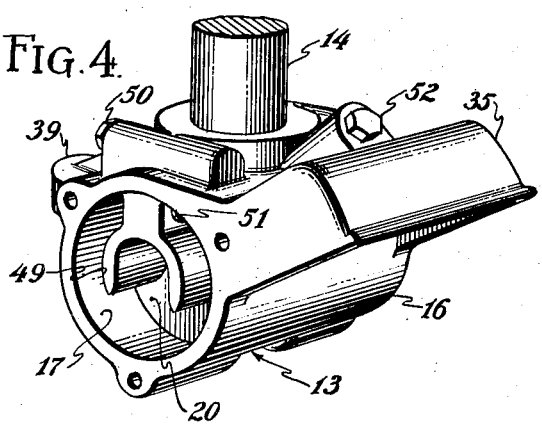
INVENTOR.
CHARLES E. HATHORN.
BY
ATTORNEY Nov. 19, 1935.  C. E. HATHORN  2,021,306
TAIL WHEEL
Filed March 20, 1933  2 Sheets-Sheet 2
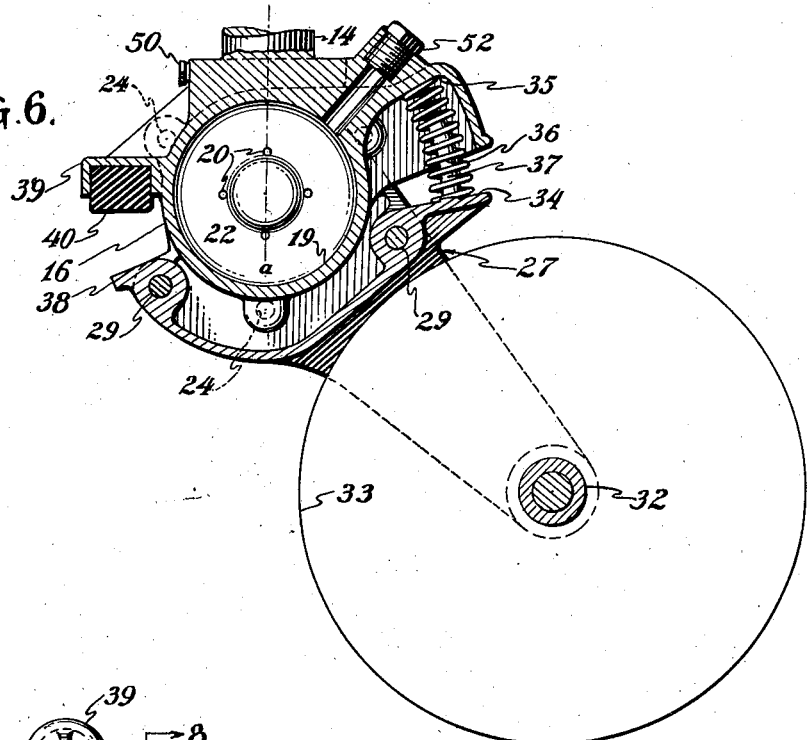
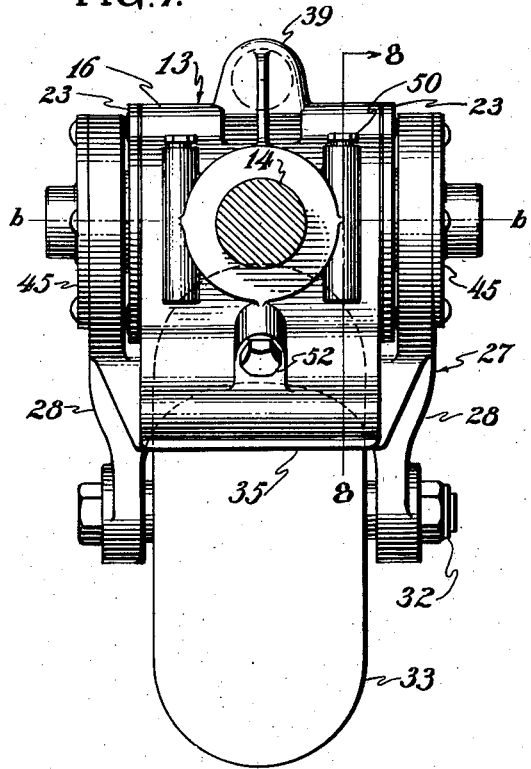
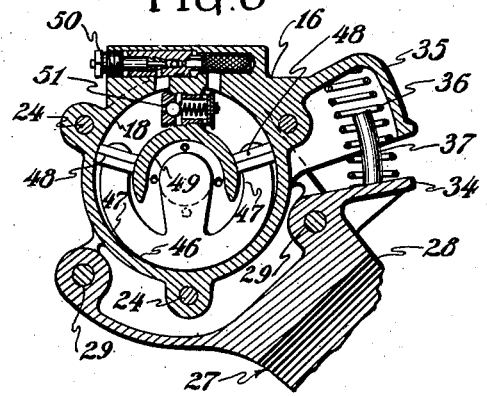
INVENTOR.
CHARLES E. HATHORN.
BY
ATTORNEY Patented Nov. 19, 1935

2,021,306

UNITED STATES PATENT OFFICE 2,021,306

TAIL WHEEL

Charles E. Hathorn, Hempstead, N. Y., assignor to Curtiss Aeroplane & Motor Company, a corporation of New York Application March 20, 1933, Serial No. 661,704

3 Claims. (Cl. 244—2)

This invention relates to landing gears for aircraft, and more particularly to improvements in swiveling tail wheel chassis.

Generally, the invention comprises a spindle carried for swiveling in bearings in the rearward portion of an aircraft fuselage, this spindle carrying at its lower end a tail wheel fork pivoted to oscillate with respect to the spindle, and hence with respect to the aircraft, in a vertical plane. Shock absorbing means are coordinated with the spindle and fork adjacent the fork pivot. As the tail wheel carried in the fork strikes an obstruction in the terrain over which the aircraft may be passing, the fork may oscillate with respect to the spindle and the movement caused by such oscillation is resisted by the built-in shock absorber.

This construction has a number of advantages from a standpoint of structural ease with which it may be installed in an aircraft. For instance, the usual swiveling tail wheel construction necessitates the use of considerable bracing for cylindrical oleo struts or the like, within the aircraft fuselage, whereas the construction of my invention requires only suitable bearings rigidly attached to the fuselage frame members. The tail wheel chassis as a whole, including all necessary shock absorption mechanism, may be fitted directly in these bearings without the necessity of special bracing and the like in the fuselage, and without the necessity of having the shock absorbing mechanism contained within the fuselage. Servicing of the tail wheel chassis of my invention is easily accomplished by removal of the whole chassis from the spindle bearings, whereupon mechanics may inspect and overhaul the device on the bench rather than under field conditions—a practice much more conducive to good workmanship.

An object of the invention is to provide a unitary tail wheel chassis having the shock absorbing mechanism in the chassis.

A further object is to provide shock absorbing mechanism in a swiveling or castering tail wheel which will be equally effective in its shock absorbing properties in any swivel position of the tail wheel chassis, and in any direction of motion of the aircraft.

A further object is to provide a tail wheel chassis in which the tail wheel may move upwardly and rearwardly from the direction of motion when encountering obstacles, thereby reducing the stresses which are imposed upon the supporting structure. It may be noted here that in those tail wheel chassis of the prior art where the tail wheel is adapted for swiveling through 360°, the movement of the tail wheel and the arrangement of the shock absorber is such that only vertical movement is permitted, thus requiring shock absorbing instrumentalities which will resiliently withstand only the vertical component of shock, while the horizontal drag component must be absorbed by the rigid frame. By the organization of my invention, I am able to provide shock absorbing mechanism of lighter construction to absorb the resultant shock imposed on the tail wheel in a horizontal as well as in a vertical direction, providing for a more resilient, a simpler, and a lighter mechanism, still capable of swiveling through 360°.

A further object of the invention is to provide a tail wheel chassis which will reduce the stresses imposed upon the aircraft fuselage.

Further objects of the invention will be apparent from a reading of the subjoined specification and claims and from a consideration of the accompanying drawings, in which:

Fig. 1 is an elevation, partly broken away, of the rear portion of an aircraft fuselage including the tail chassis of my invention;

Fig. 2 is a rear elevation of the tail chassis;

Fig. 3 is an enlarged section on the line 3—3 of Fig. 1;

Fig. 4 is a perspective of a portion of the tail chassis;

Fig. 5 is a front elevation, partly in section, of the tail wheel fork forming a part of the tail chassis;

Fig. 6 is a section on the line 6—6 of Fig. 2;

Fig. 7 is a plan of the tail chassis; and

Fig. 8 is a section on the line 8—8 of Fig. 7.

In the drawings, similar numbers indicate similar parts. Referring to Fig. 1, an aircraft body 10 is provided at its rearward end with a rudder 11 and with a tail chassis designated in its entirety as 12. The chassis 12 includes a member 13, also shown in other figures, at the upper portion of which is a spindle 14, which is adapted to be carried for swiveling in suitable bearings 15 mounted in the rearward portion of the body 10. Suitable releasable steering mechanism of conventional form may be attached to the upper end of the spindle 14, for steering the aircraft during taxiing.

The lower end of the member 13 is formed as a housing 16 having laterally facing circular recesses 17 and 18 (Figs. 3 and 4) aligned on a substantially horizontal axis $b$—$b$ which intersects the vertical axis $a$—$a$ of the spindle 14. A cored reservoir 19 is formed centrally in the housing 16 and is adapted to communicate with the recesses 17 and 18 by means of holes 20 drilled through the defining walls 21 and 22 separating the reservoir 19 from the recesses 17 and 18. A pair of similar covers 23 are adapted to be attached to the lateral faces of the housing 16 to cover the recesses 17 and 18, these covers being attached to said housing as by screws 24.

The covers 23 are formed with journals 25 and with bearing openings 26, both being axially aligned with the axis b—b of the recesses 17 and 18.

A tail wheel fork 27, comprising separate oppositely facing but otherwise similar tines 28 (Fig. 5) have formed therein openings 30 in their upper ends which are adapted to engage the journals 25 on the covers 23. Bolts 29 are provided to fasten the tines 28 rigidly to each other. Suitable ball bearings, such as 31, may be interposed between the journals 25 and the fork openings 30. By the structure thus far described, it will be seen that the member 13, by virtue of the spindle 14 and the bearing 15, may swivel with respect to the aircraft about the substantially vertical axis a—a, while the fork 27 may oscillate about the substantially horizontal axis b—b, on the bearings 31, with respect to the member 13 while moving swivelly therewith.

The lower ends of the fork tines 28 are provided with openings within which a tail wheel axle 32 is adapted to engage, the axle 32 carrying a tail wheel 33 for ground contact.

Toward the upper portion of the fork 27, an abutment 34 is formed, and on the housing 16 a cupped abutment 35 is formed (Figs. 6 and 8). Between the two abutments 34 and 35 a plurality of compression springs 36 are inserted, suitable arcuate guiding rods 37 being attached to one of said abutments to locate the springs 36. These springs resiliently sustain the weight of the rearward portion of the aircraft when the aircraft rests upon or rolls along the ground, allowing the wheel 33 to trail as a caster behind the swivel axis a—a. As the aircraft rolls along the ground, it is possible for the rearward end of the aircraft and tail chassis to bounce, which would allow oscillation of the fork 27 in both directions with respect to the member 13 (Figs. 1 and 6). To provide for limiting the rebound oscillation, abutments 38 and 39 are provided respectively on the fork 27 and on the housing 16, one of said abutments being provided with a rubber cushion 40 to act as a buffer.

It is apparent that, unless suitable shock absorbing mechanism is provided in the device, free oscillation of the tail wheel fork 27 could occur in the travel of the aircraft along the ground which would tend to cause the aircraft to bounce unduly. Hence, a hydraulic shock absorbing mechanism is provided in conjunction with, and housed within the housing 16 of the member 13, such shock absorbing mechanism serving to damp out oscillation of the tail wheel fork. Any suitable non-reactive damping device may be incorporated between the fork 27 and the member 13, but I have chosen to illustrate one form which in itself is old in the art of non-reactive hydraulic shock absorbing device. A brief description of this device will be given. I have embodied in the device a pair of similar shock absorbing units, one on each side of the axis a—a of the spindle 14. A description of the details of one such unit will suffice for both. Referring particularly to Figs. 3 and 8, a shaft 43 is borne in the opening 26 of the cover 23 and is provided at its outer end with splines 44 engaging internal splines in a cover plate 45 attached to one of the tines or fork elements 28, over its opening 30. The shaft 43 carries at its inner end a yoke 46 having a pair of segmental piston rods 47 extending throughout part of the circumference of the recess 18. The piston rods 47 are provided at their ends with leather seals 48 adapted to engage the surface of the recess 18, the lateral walls of said recess, and a U-shaped extension 49 carried within and by the housing 16. Oscillation of the fork 27 causes oscillation of the piston rods 47 within the chamber formed by the recess 18 and the extension 49. Valves 50 and 51 are provided in the housing 16 to permit the transfer of fluid from that portion of the chamber adjacent one piston rod 47 to that portion of the chamber adjacent the other piston rod 47. The orifices of the valves 50 and 51 are of such size that a retarding or damping effect is obtained against the oscillation of the rods 47 and hence, of the fork 27. The previously mentioned reservoir 19 may be filled with hydraulic fluid through a filler opening 52, shown in Fig. 6, the fluid passing through the holes 20 to keep the aforementioned chambers full at all times.

The elements of the shock absorber mechanism just described are similar in their construction and operation to the commercially available automotive shock absorbing unit known as the Watson supercharging hydraulic shock absorber, and are shown in connection with this application as a convenient arrangement for incorporation in the tail chassis of this invention. Other non-reactive shock absorbing units may be incorporated in the tail chassis with equal facility, and it is likewise possible to incorporate in the chassis, or within the housing 16, a reactive shock absorbing unit which might coordinate the functions of the Watson type hydraulic absorber with the resilient springs 36.

It is believed that the foregoing description is adequate to convey the nature of my invention, the essential mechanical features of which are that the oscillating axis for the tail wheel fork 27 is substantially horizontal and is also substantially parallel to the wheel axis 32. Shock absorbing and resilient taxiing means are arranged to operate about said horizontal oscillating axis, such axis and such devices all being formed as part of the tail wheel chassis, and the whole chassis 12 being adapted to swivel with respect to the aircraft.

In its preferred form, the tail chassis is removable as a unit from the swivel bearing 15. By virtue of the construction outlined, the tail chassis may swivel through 360° and the shock absorbing and resilient mechanism incorporated in the chassis may operate with equal facility regardless of the swiveling position.

In operation, the effect obtained by this feature is most advantageous. For instance, if the aircraft is traveling along the ground and the operator turns the ship, the tail chassis may swivel, allowing the tail wheel to caster behind the swivel. The angular position of the tail chassis with respect to the aircraft will have no effect upon the efficiency of the shock absorbing mechanism, nor will it tend to increase the stresses imposed upon the frame structure of the aircraft. The dynamic effect of tail chassis of the prior art, when the chassis is in angular attitude with respect to the aircraft, usually imposes more severe stresses upon the aircraft frame members. The construction of this invention also allows for the low stressed action of a ground contact element which may move both rearwardly and upwardly, at the same time permitting castering or swiveling action through a full 360°.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a tail wheel mounting for aircraft, a substantially vertical spindle journaled in said aircraft for swiveling, a housing carried at the lower end of said spindle and substantially axially aligned therewith, said housing having contained therein a non-reactive shock absorbing device, a tail wheel fork connected with said shock absorber and journaled on said housing on an axis normal to said spindle axis, a pair of abutments carried by said housing, a pair of abutments carried by said fork, one abutment of each pair being organized to cooperate with one abutment of the other pair whereby said fork may move in a limited angular sense with respect to said housing, and resilient means between the cooperating abutments of each pair.

2. In a tail wheel mounting for aircraft, a substantially vertical spindle journaled in said aircraft for swiveling, a housing carried at the lower end of said spindle and substantially axially aligned therewith, said housing having contained therein a non-reactive shock absorbing device, a tail wheel fork connected with said shock absorber and journaled on said housing on an axis normal to and substantially intersecting said spindle axis, an abutment extending from said housing substantially on a radius from said fork axis, an abutment extending from said fork also substantially on a radius from said fork axis said radii being of equal length, and a coil spring between said abutments acting to urge said fork downwardly with respect to said spindle.

3. In a tail wheel mounting for aircraft, a substantially vertical spindle journaled in said aircraft for swiveling, a member fixed to the bottom of said spindle and having a pivot axis normal to and substantially intersecting the spindle axis, a tail wheel fork journaled on said pivot for oscillation with respect to said spindle, a pair of abutments extending substantially radially and equidistantly from said pivot axis, one of the pair being carried by said member and the other of the pair by said fork, and a plurality of coil springs acting between said abutments for urging said fork downwardly about said pivot axis, the axes of said springs being circumferentially disposed about said pivot axis.

CHARLES E. HATHORN.